United States Patent [19]

Matney

[11] 3,950,157
[45] Apr. 13, 1976

[54] RAM AIR FILTER FOR LIGHT AIRCRAFT

[76] Inventor: Dorrance Henry Matney, 24415 - 116th Ave. SE., Kent, Wash. 98031

[22] Filed: Oct. 7, 1974

[21] Appl. No.: 512,488

[52] U.S. Cl. .................. 55/490; 55/306; 55/491; 55/501; 55/503; 55/529; 55/DIG. 31; 60/39.09 P; 244/53 B
[51] Int. Cl.² ........................................ B01D 46/10
[58] Field of Search ............ 55/490, 491, 493, 501, 55/502, 503, 504, 515, 516, 519, 522, 527, 529, DIG. 31, 528, 511, 306; 244/53 B; 60/39.09 P

[56] References Cited
UNITED STATES PATENTS

| | | | |
|---|---|---|---|
| 2,252,724 | 8/1941 | Myers | 55/502 |
| 2,999,562 | 9/1961 | Lechtenberg | 55/502 |
| 3,046,719 | 7/1962 | Tropiano | 55/519 X |
| 3,111,489 | 11/1963 | Getzin | 55/503 X |
| 3,149,942 | 9/1964 | Finch | 55/529 X |
| 3,252,580 | 5/1966 | Getzin | 55/503 X |
| 3,347,025 | 10/1967 | Wiley | 55/529 X |
| 3,552,103 | 1/1971 | Smith | 55/DIG. 28 |
| 3,577,710 | 5/1971 | Feldman | 55/491 X |
| R19,260 | 7/1934 | Shurtleff | 55/493 X |

FOREIGN PATENTS OR APPLICATIONS

| | | | |
|---|---|---|---|
| 1,350,576 | 3/1963 | France | 55/493 |
| 1,407,875 | 11/1968 | Germany | 55/491 |

*Primary Examiner*—Frank W. Lutter
*Assistant Examiner*—David L. Lacey
*Attorney, Agent, or Firm*—Christensen, O'Connor, Garrison & Havelka

[57] ABSTRACT

A ram air filter for light aircraft comprising a parallelepiped housing and a replaceable filter element is disclosed. The housing comprises a base element and a cover element, which are injection molded of high impact plastic and are connected together in a snap-lock manner. The parallel faces of the base and cover elements include a plurality of ribs that define aligned apertures through which incoming air enters and leaves the housing. The ribs are formed such that they present a minimal amount of surface area to the incoming air stream during flight. A plurality of 90° locking studs attach the housing to the air intake channel of the aircraft's carburetor. The replaceable filter element is also parallelepiped in form and lies in the space defined by the housing so as to filter the air flowing through the aligned apertures. The replaceable filter element is formed of a compressible foam, preferably having a porosity grade lying in the range of 20–50 pores per linear inch.

5 Claims, 3 Drawing Figures

U.S. Patent  April 13, 1976  3,950,157
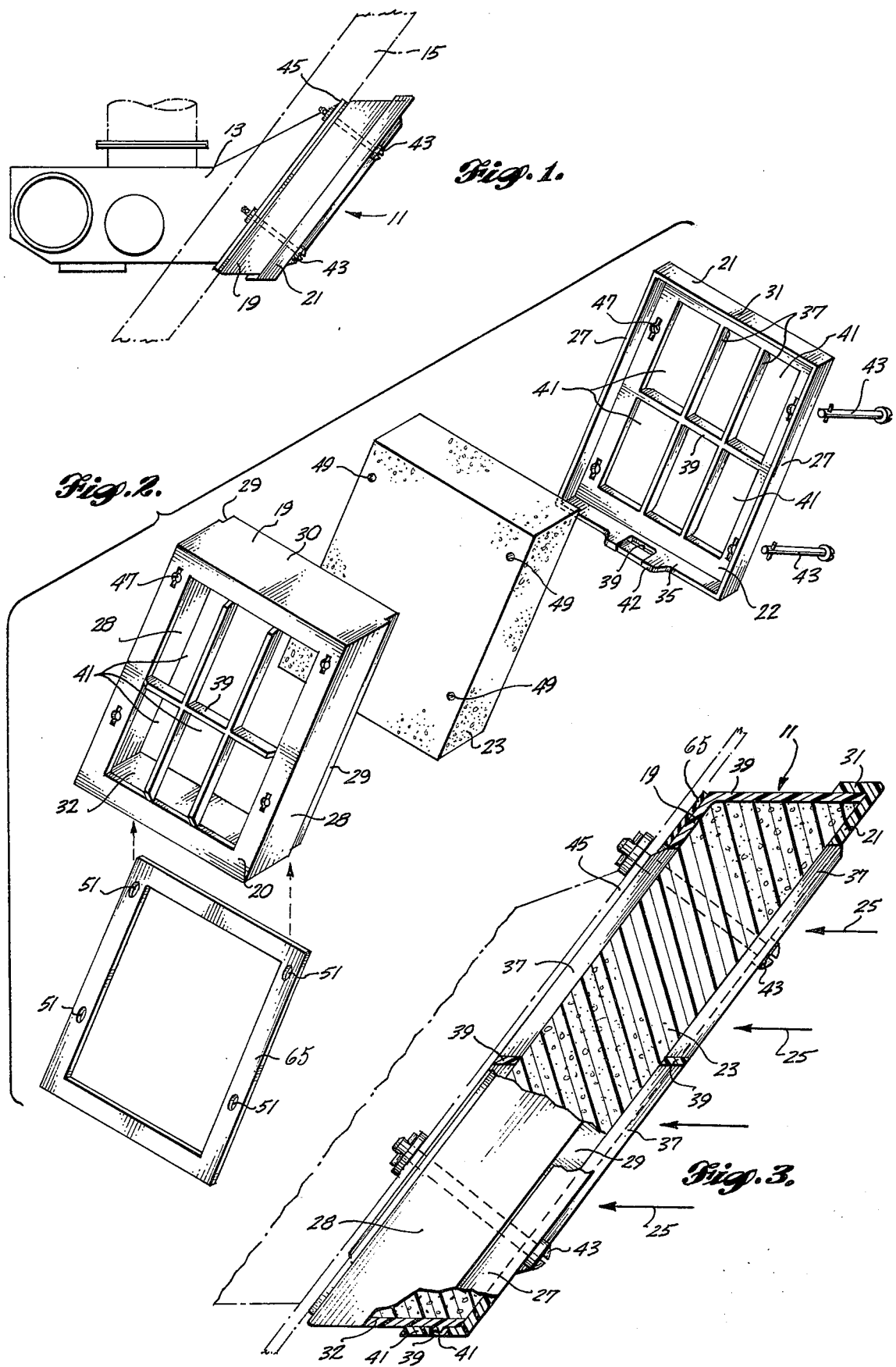

RAM AIR FILTER FOR LIGHT AIRCRAFT

BACKGROUND OF THE INVENTION

This invention is directed to air filters and, more particularly, to ram air filters for light aircraft.

The majority of light aircraft, such as the Cessna 150, 172, 182, etc., are driven by internal combustion engines, which include carburetors that control the air/fuel mixture received by the engine. Air entering the carburetor is filtered by a ram air filter, which removes dust and other undesirable particles so as to prevent their entry into the engine via the carburetor.

The most common types of ram air filter presently in use include a metallic housing having relatively large apertures formed in opposing faces. In one type the apertures are enclosed by metal grids between which lie a fluid pervious paper filter. The paper filter is corrugated in a manner such that a plurality of V-shaped pleats are formed. An adhesive positioned along the entire outer length of each of the folds forms a protective cap therefore. The adhesive also attaches the grids to the folds of the paper filter. A pleated filter of this nature is more completely described in U.S. Pat. No. 3,216,578 entitled "Pleated Filter" and issued to T. E. Wright et al. on Nov. 9, 1965. In an alternate type of prior art ram air filter, the metallic housing supports a filter medium formed of pleated screened wire coated with nylon flocking. Usually two pleated layers are included, mounted orthogonally to one another.

Ram air filters of the types described above have a variety of disadvantages. The pleated paper filter types tend to absorb moisture and open up. Obviously, a filter medium with relatively large openings allows relatively large particles to pass and, thus, enter the engine. In addition, moisture loosens the glue attaching the paper filter to its associated support grid. With regard to the pleated screen wire filters, their flocking wears off. As the flocking wears off, relatively large openings are formed. Moreover, in some instances the screen breaks down in a manner such that small bits are drawn into the engine through the carburetor.

Filters of the types described in the foregoing paragraph also have other disadvantages. Because of the manner in which they are formed, the entire structure, including the metallic housing, not just the pleated filter portion, must be replaced, when the filter becomes unusable. Further, because much of the overall filter structure is formed of metal, and because aircraft are often parked where they are exposed to the elements, prior art filters of the type described above often rust. Because they rust, in some instances they must be replaced even though the filtering medium has not reached the point where it is unusable. In addition, it has been found that it is difficult to visually determine when filters of the type described above have deteriorated to the point where they are unusable. Thus, for safety reasons, filters are usually replaced more frequently than absolutely necessary.

It will be appreciated from the foregoing discussion that ram air filters for light aircraft must be frequently replaced. However, replacement prior to the present invention has been more expensive than desirable because, as noted above, the entire filter structure, including the housing must be replaced due to the manner of construction of prior art filters.

Therefore, it is an object of this invention to provide a new and improved air filter for light aircraft.

It is a further object of this invention, to provide a new and improved ram air filter for light aircraft driven by internal combustion engines that is formed substantially entirely of materials that will not rust.

It is a further object of this invention to provide a new and improved ram air filter for light aircraft that includes a reusable housing and a replaceable filter element formed of relatively inexpensive materials.

It is a still further object of this invention to provide a replaceable filter element adapted to be housed in a ram air filter housing that is suitable for use by light aircraft.

It is a still further object of this invention to provide a new and improved replaceable ram air filter element suitable for use by light aircraft that is inexpensive to manufacture and, thus, inexpensive to replace at frequent intervals.

SUMMARY OF THE INVENTION

In accordance with principles of this invention, a ram air filter suitable for use by light aircraft is provided. The ram air filter comprises a parallelepiped housing formed of a nonrusting material and a replaceable filter element adapted to be housed within the housing. The housing is designed so as to open to allow access to the interior thereof for replacement of the filter element.

In accordance with further principles of this invention, the housing comprises a base element and a cover element, both of which are formed of high impact plastic. Preferably, the base and cover elements are connected together in a snap-lock manner.

In accordance with still further principles of this invention, the base and cover elements include faces which are parallel to one another, and the parallel faces include a plurality of ribs that define aligned apertures through which incoming air enters and leaves the housing. Located between the aligned apertures is the replaceable filter element.

In accordance with other principles of this invention, the ribs which define the aligned apertures are formed such that they present a minimal surface area to the incoming air stream during flight. Moreover, 90° locking studs are provided to attach the housing to the aircraft's carburetor air intake channel.

In accordance with yet other principles of this invention, the replaceable filter element is also parallelepiped in form and lies in the space defined by the housing. The replaceable filter element is formed of a compressible foam, preferably having a porosity lying in the range of 20–50 pores per linear inch.

It will be appreciated from the foregoing brief summary that the invention provides a ram air filter suitable for use on light aircraft that overcomes the problems of prior art ram air filters discussed above. Because the structure is formed essentially entirely of nonrust materials (preferably a high impact plastic housing and an open cell foam filter material), it does not have the rust problems discussed above. Further, because the filter element is replaceable, the total cost of filtering incoming air per unit of time is greatly reduced. Moreover, the size of the particles removed from the incoming air is greatly reduced, whereby engine life is greatly increased.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a side view illustrating a ram air filter formed in accordance with the invention connected to the air intake channel of the carburetor of a light aircraft;

FIG. 2 is an exploded perspective view of a ram air filter formed in accordance with the invention; and FIG. 3 is a cross-sectional view of an assembled ram air filter formed in accordance with the invention.

DESCRIPTION OF THE PREFERRED EMBODIMENT

FIG. 1 illustrates a ram air filter 11 formed in accordance with the invention attached to an air intake channel 13, which runs to the air intake of a carburetor (not shown) of the internal combustion engine (also not shown) of an aircraft. The air intake channel 13 is illustrated as extending through the cowling 15 of the aircraft, and the ram air filter 11 is illustrated as mounted exterior to the cowling 15. However, it is to be understood that the ram air filter 11 may be mounted in a suitable aperture formed in the cowling if the associated aircraft is designed for such mounting. Thus, it will be further understood that the invention is adapted for use in a variety of types of aircraft and should not be construed as being limited to the specific arrangement illustrated and described herein.

The ram air filter 11 of the invention comprises: a parallelepiped housing, formed of a base 19 and a cover 21; and, a parallelepiped filter element 23.

The parallelepiped housing defines right rectangles in two of its principal bisecting planes, and a nonright parallelogram (i.e., one having opposed acute angles and opposed obtuse angles) in its remaining principal bisecting plane. A cross-sectional view illustrating the nonright parellelogram plane is illustrated in FIG. 3. The base 19 is generally box shaped and includes a main apertured wall 20 from which a pair of opposed side walls 28 and a pair of end walls 30 and 32 extend in the same direction. The side walls 28 form a right angle with the main apertured wall 20. One of the end walls 30, hereinafter referred to as the obtuse wall, defines an obtuse angle with the main apertured wall 20. The other end wall 32, hereinafter referred to as the acute wall, defines an acute angle with the main apertured wall 20. The remaining wall of the base is open and is enclosed by the cover 21.

The cover 21 also includes a main apertured wall 22. Extending outwardly from the same side of the main apertured wall 22 of the cover are a pair of side lips 27 and a pair of end lips 31 and 35. The side lips 27 form a right angle with the main apertured wall 22. One of the end lips 31, hereinafter referred to as the acute lip, defines an acute angle with the main apertured wall. The other end lip, hereinafter referred to as the obtuse lip, defines an obtuse angle with the main apertured wall 22. The size and nature of the walls of the base 19 and the lips of the cover 21 are such that the side lips lie in undercut regions 29 formed in the outer surfaces of the outer edges of the side walls of the base 19 when the cover is affixed to the base. In addition, the acute lip 31 lies against the outer surface of the obtuse wall 30 and the obtuse lip 35 lies against the outer surface of the acute wall 32. The obtuse lip 35 includes an aperture 30 adapted to receive a projection 41 that projects outwardly from the acute wall 32. It will be appreciated that the combination of the acute lip 31 lying against the obtuse wall 30 and the aperture 39 and its associated projection 41 form a locking mechanism which "snap-locks" the cover 21 to the base 19. This locking mechanism allows the cover to be rapidly and quickly locked to the base. An outwardly extending tab 42 within which the aperture 39 lies provides for ease of disassembly.

The main apertured walls 22 and 20 of the cover 21 and the base 19 lie in parallel planes. These walls each include two parallel ribs 37 which lie in planes parallel to the side walls 28 and side lips 27. Located orthogonal to the two parallel ribs 37, in each main apertured wall is a cross rib 39. These ribs define six apertures 41 in each main apertured wall that lie within an encircling border to which the various walls and lips are attached. The six apertures in each main apertured wall are aligned with associated apertures in the other wall when the cover 21 is affixed to the base 19 in the manner previously described.

As illustrated in the drawing, the parallel ribs 37 and the cross ribs 39 are formed such that they present minimal surface areas to the air flow direction 25 (FIG. 3), particularly when the aircraft utilizing the invention is trimmed for level flight. More particularly, the cross ribs 39, as best seen in FIG. 3, have a cross-sectional parallelogram configuration. An opposed pair of the cross-sectional surfaces (illustrated as the upper and lower surfaces) lie in planes parallel to the planes defined by the acute and obtuse walls 30 and 32 and lips 31 and 35. This position results in only a very narrow edge lying in the air flow path. In a generally similar manner, the parallel ribs 37 are oriented such that their main wall surfaces lie in planes parallel to the side walls and lips. Thus, only a narrow edge of the parallel ribs lies in the air flow path.

The parallelepiped filter element 23 is sized such that it fits within the parallelepiped space defined by the base 19 and the cover 21 when assembled. The filter element is formed of a compressible foam, preferably having a porosity lying in the range of from 20 to 50 pores per linear inch. Thus, it will be appreciated that the filter element 23 defines right rectangular parallelograms when viewed in two of its principal bisecting planes, and a nonright parallelogram when viewed in the third of its principal bisecting planes. In the third such plane, it defines a parallelogram having opposed acute angles and opposed obtuse angles.

While a variety of materials can be utilized to form the filter element 23, a suitable material is sold under the tradename Scott Filter Foam and is available from Foam Division, Scott Paper Company, 1500 E. 2nd St., Chester, Penn. 19013. This foam material is a reticulated, flexible polyester urethane foam that has a three-dimensional structure of skeletal strands which give it unique filtering properties.

A plurality of 90° locking studs 43, illustrated as four in number, attach the ram air filter of the invention to a flange extending outwardly from the carburetor air intake channel 13. The 90° locking studs comprise elongated studs with slotted heads located at one end. Pins extend orthogonally outwardly from the other ends of the studs. The locking studs slide through aligned slotted apertures 47 formed in the encircling border surrounding the apertures 41 formed in the main apertured walls of the base 19 and the cover 21. The slotted apertures 47 have cylindrical centers and a pair of outwardly extending diagonally arrayed legs.

Apertures 49, aligned with the slotted apertures 47, are also formed in the filter element 43. In addition, similarly formed and sized slotted apertures are formed in a flange 45 projecting outwardly about the entrance to the carburetor air intake channel 13.

Located between the ram air filter element 11 of the invention and the flange 45 is a flat gasket 65. The gasket surrounds the apertures 41 in the main apertured wall of the base 19 and includes aligned apertures 51 through which the 90° locking bolts 32 pass. If desired, rather than being slotted, the apertures 51 in the gasket may be oval or round since the relatively soft nature of the gasket material allows the pins, forming a portion of the 90° locking studs 43, to be relatively easily forced through such apertures.

The 90° locking studs, as is well known in the art, will lock the ram air filter of the invention to the flange 45 when the pin ends of the studs pass through the various apertures, including the apertures in the flange 45, and are rotated through an angle of 90° with respect to the axis of the legs forming a portion of the slotted apertures.

It will be appreciated from the foregoing description that the invention provides a new and improved ram air filter for light aircraft. Preferably, the housing, including the base and cover, is injected molded of high impact plastic. The base including its associated ribs is formed as one continuous element and the cover, including its associated ribs, is formed as a second continuous element. These elements are readily assembled about a filter element and the resultant filter assembly is readily attached to the carburetor air intake channel of a light aircraft in the manner heretofore described. When it is necessary to replace the filter element, the housing is opened and the filter element is replaced with another inexpensive filter element, rather than the entire assembly being replaced. The invention, because it is essentially entirely formed of nonrusting materials (except for the 90° locking studs, which are preferably formed of a nonrust material such a cadmium plated iron), is not subject to rusting and the resultant problems created thereby.

While a preferred embodiment of the invention has been illustrated and described, it will be appreciated by those skilled in the art and others that various changes can be made therein without departing from the spirit and scope of the invention. For example, the ribs can be increased (or decreased) in number to provide an apertured surface having a lesser or greater number of apertures than six depending upon the specific requirements of the engine with which the invention is to be utilized. Moreover, the outer peripheral surface can take on other configurations, as required by the carburetor intake channel of the engine with which the invention is to be used. Hence, the invention can be practiced otherwise than as specifically described herein.

The embodiments of the invention in which an exclusive property or privilege is claimed are defined as follows:

1. A ram air filter for light aircraft comprising:
   1. a paralleleipiped housing defined by right rectangular parallelograms when viewed in two of its principal bisecting planes and a non-right parallelogram when viewed in the third of its principal bisecting planes, said parallelepiped housing comprising:
      a. a base element formed of high impact plastic, said base element including: an apertured main wall; a pair of opposed parallel side walls projecting outwardly from one side of said apertured main wall; an obtuse end wall projecting outwardly from the same side of said apertured main wall as said side walls at an obtuse angle; and, an acute end wall projecting outwardly from the same side of said apertured main wall as said side walls at an acute angle, said obtuse and acute end walls projecting outwardly from opposite edges of said apertured main wall; and
      b. a cover element formed of high impact plastic, said cover element including: an apertured main wall; a pair of opposed parallel side lips projecting outwardly from one side of said apertured main wall; an obtuse end lip projecting outwardly from the same side of said apertured main wall as said side lips at an obtuse angle; and, an acute end lip projecting outwardly from the same side of said apertured main wall as said side lips at an acute angle, said obtuse and acute end lips projecting outwardly from opposed edges of said apertured main wall;
      c. said base and cover elements assemblable together in a manner such that they define an enclosure through which air can flow by entering the enclosure through the apertured main wall of one of said base and cover elements and leaving said enclosure through the apertured main wall of the other of said base and cover elements, said apertured main wall of said base element lying in a plane parallel to said apertured main wall of said cover element; and,
   2. a filter element formed of a compressible foam material mounted in the enclosure defined by said base and cover elements and sized so as to substantially entirely fill said enclosure between said apertured main walls.

2. A ram air filter as claimed in claim 1 wherein said acute end lip of said cover element lies against the outer surface of the obtuse end wall of said base element; and, including a projection projecting outwardly from the acute end wall of said base element and an aperture formed in the obtuse end lip of said cover element, said acute end lip and said obtuse end wall, and said projection and said aperture, co-acting to snap-lock said cover element to said base element.

3. A ram air filter for light aircraft comprising:
   1. a housing comprising:
      a. a base element, said base element including: an apertured main wall; a pair of opposed parallel side walls projecting outwardly from one side of said apertured main wall; an obtuse end wall projecting outwardly from the same side of said apertured main wall as said side walls at an obtuse angle; and, an acute end wall projecting outwardly from the same side of said apertured main wall as said side walls at an acute angle, said obtuse and acute end walls projecting outwardly from opposed edges of said apertured main wall; and,
      b. a cover element, said cover element including: an apertured main wall; a pair of opposed parallel side lips projecting outwardly from one side of said apertured main wall; an obtuse end lip projecting outwardly from the same side of said apertured main wall as said side lips at an obtuse angle; and, an acute end lip projecting outwardly from the same side of said apertured main wall as said side lips at an acute angle, said obtuse and acute end lips projecting outwardly from opposed edges of said apertured main wall;

c. said base and cover elements assembled together in a manner such that they define an enclosure through which air can flow by entering the enclosure through the apertured main wall of one of said base and cover elements and leaving said enclosure through the apertured main wall of the other of said base and cover elements; and 2. a filter element formed of a compressible foam material mounted in the enclosure defined by said base and cover elements and sized so as to substantially entirely fill said enclosure between said apertured main walls.

4. A ram air filter as claimed in claim 3 wherein said acute end lip of said cover element lies against the outer surface of the obtuse end wall of said base element; and, including a projection projecting outwardly from the acute end wall of said base element and an aperture formed in the obtuse end lip of said cover element, said acute end lip and said obtuse end wall, and said projection and said aperture, co-acting to snap-lock said cover element to said base element.

5. A ram air filter for light aircraft comprising:

1. a parallelepiped housing, said parallelpiped housing defining right rectangular parallelograms when viewed in two of its principal bisecting planes and a non-right parallelogram when viewed in the third of its principal bisecting planes, said housing comprising:

a. a base element including: an apertured main wall; a pair of opposed parallel sides projecting outwardly from one side of said apertured main wall; an obtuse end wall projecting outwardly from the same side of said apertured main wall as said side walls, at an obtuse angle; and, an acute end wall projecting outwardly from the same side of said apertured main wall as said side walls at an acute angle, said obtuse and acute end walls projecting outwardly from opposed edges of said apertured main wall; and, b. a cover element including: an apertured main wall; a pair of opposed side lips projecting outwardly from one side of said apertured main wall; an obtuse end lip projecting outwardly from the same side of said apertured main wall as said side lips at an obtuse angle; and, an acute end lip projecting outwardly from the same side of said apertured main wall as said side walls at an acute angle, said obtuse and acute end lips projecting outwardly from opposed edges of said apertured main wall;

c. said base and cover elements assembled together in a manner such that they define an enclosure through which air can flow by entering the enclosure through the apertured main wall of one of said base and cover elements and leaving said enclosure through the apertured main wall of the other of said base and cover elements; and, 2. a filter element formed of a compressible foam material mounted in the enclosure defined by said base and cover elements and sized so as to substantially entirely fill said enclosure between said apertured main walls.

* * * * *